(12) United States Patent
Petržílek et al.

(10) Patent No.: US 7,867,291 B2
(45) Date of Patent: Jan. 11, 2011

(54) LASER-WELDED SOLID ELECTROLYTIC CAPACITOR

(75) Inventors: Jan Petržílek, Usti nad Orlici (CZ); Ivan Horáček, Lanskroun (CZ)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 12/785,012

(22) Filed: May 21, 2010

(65) Prior Publication Data

US 2010/0229361 A1    Sep. 16, 2010

Related U.S. Application Data

(62) Division of application No. 11/849,559, filed on Sep. 4, 2007, now Pat. No. 7,724,502.

(51) Int. Cl.
*H01G 9/00* (2006.01)
(52) U.S. Cl. .................................. 29/25.03
(58) Field of Classification Search ............... 29/25.03
See application file for complete search history.

(56) References Cited

U.S. PATENT DOCUMENTS

| | | |
|---|---|---|
| 3,345,545 A | 10/1967 | Bourgault et al. |
| 4,085,435 A | 4/1978 | Galvagni |
| 4,945,452 A | 7/1990 | Sturmer et al. |
| 4,972,299 A | 11/1990 | Hagiwara et al. |
| 5,198,968 A | 3/1993 | Galvagni |
| 5,357,399 A | 10/1994 | Salisbury |
| 5,390,074 A | 2/1995 | Hasegawa et al. |
| 5,394,295 A | 2/1995 | Galvagni et al. |
| 5,495,386 A | 2/1996 | Kulkarni |
| 5,729,428 A | 3/1998 | Sakata et al. |
| 5,930,109 A | 7/1999 | Fishler |
| 5,949,639 A | 9/1999 | Maeda et al. |
| 6,191,936 B1 | 2/2001 | Webber et al. |
| 6,197,252 B1 | 3/2001 | Bishop et al. |

(Continued)

FOREIGN PATENT DOCUMENTS

EP    1209706 A2    5/2002

(Continued)

OTHER PUBLICATIONS

UK Search Report for GB0814425.5 dated Nov. 18, 2008, 4 pages.

*Primary Examiner*—Alexander G Ghyka
*Assistant Examiner*—Seahvosh J Nikmanesh
(74) *Attorney, Agent, or Firm*—Dority & Manning, P.A.

(57) ABSTRACT

A solid electrolytic capacitor that is capable of withstanding laser welding without a significant deterioration in its electrical performance is provided. The capacitor contains an anode body, dielectric layer overlying the anode body, and a solid organic electrolyte layer overlying the dielectric layer. Furthermore, the capacitor of the present invention also employs a light reflective layer that overlies the solid organic electrolyte layer. The present inventors have discovered that such a light reflective layer may help reflect any light that inadvertently travels toward the capacitor element during laser welding. This results in reduced contact of the solid organic electrolyte with the laser and thus minimizes defects in the electrolyte that would have otherwise been formed by carbonization. The resultant laser-welded capacitor is therefore characterized by such performance characteristics as relatively low ESR and low leakage currents.

19 Claims, 4 Drawing Sheets

U.S. PATENT DOCUMENTS

| | | |
|---|---|---|
| 6,236,561 B1 | 5/2001 | Ogino et al. |
| 6,262,878 B1 | 7/2001 | Shirashige et al. |
| 6,322,912 B1 | 11/2001 | Fife |
| 6,400,556 B1 | 6/2002 | Masuda et al. |
| 6,430,034 B2 | 8/2002 | Sano et al. |
| 6,459,566 B1 | 10/2002 | Casby et al. |
| 6,467,142 B1 | 10/2002 | Shirashige et al. |
| 6,477,030 B2 | 11/2002 | Hidaka et al. |
| 6,504,705 B2 | 1/2003 | Shimada et al. |
| 6,519,135 B2 | 2/2003 | Sano et al. |
| 6,616,713 B2 | 9/2003 | Sano et al. |
| 6,625,009 B2 | 9/2003 | Maeda |
| 6,674,635 B1 | 1/2004 | Fife et al. |
| 6,687,118 B1 | 2/2004 | O'Phelan et al. |
| 6,717,793 B2 | 4/2004 | Arai et al. |
| 6,751,086 B2 | 6/2004 | Matsumoto |
| 6,808,541 B2 | 10/2004 | Maeda |
| 6,845,003 B2 | 1/2005 | Oyama et al. |
| 6,870,727 B2 | 3/2005 | Edson et al. |
| 6,870,728 B1 | 3/2005 | Buret et al. |
| 6,882,521 B2 | 4/2005 | Tsutsui et al. |
| 6,891,717 B2 | 5/2005 | Fujii et al. |
| 6,903,921 B2 | 6/2005 | Ishijima |
| 6,903,922 B2 | 6/2005 | Sano et al. |
| 6,906,912 B2 | 6/2005 | Arai et al. |
| 6,920,037 B2 | 7/2005 | Sano et al. |
| 6,954,351 B2 | 10/2005 | Konuma et al. |
| 6,970,345 B2 | 11/2005 | Oh et al. |
| 6,992,880 B2 | 1/2006 | Tadanobu et al. |
| 6,995,972 B2 | 2/2006 | Fujii et al. |
| 7,027,291 B2 | 4/2006 | Horio et al. |
| 7,057,882 B2 | 6/2006 | Fujii et al. |
| 7,116,548 B2 | 10/2006 | Satterfield, Jr. et al. |
| 7,443,653 B2 | 10/2008 | Kim et al. |
| 2002/0167786 A1 | 11/2002 | Sano et al. |
| 2006/0038304 A1 | 2/2006 | Osako et al. |

FOREIGN PATENT DOCUMENTS

| | | |
|---|---|---|
| JP | 8186061 A | 7/1996 |
| JP | 2006032382 A | 2/2006 |

LASER-WELDED SOLID ELECTROLYTIC CAPACITOR

RELATED APPLICATIONS

The present application is a divisional of U.S. application Ser. No. 11/849,559, filed on Sep. 4, 2007, which is incorporated herein in its entirety by reference thereto.

BACKGROUND OF THE INVENTION

Conventional solid organic electrolytic capacitors contain an anode body, dielectric layer, and a solid organic electrolyte. An anode wire projects from a surface of the capacitor for electrically connecting the anode body to a termination. One beneficial technique that is sometimes employed to connect the anode wire to the termination is laser welding. Lasers generally contain resonators that include a laser medium capable of releasing photons by stimulated emission and an energy source that excites the elements of the laser medium. The energy source may provide continuous energy to the laser medium to emit a continuous laser beam or energy discharges to emit a pulsed laser beam. One type of suitable laser is one in which the laser medium consists of an aluminum and yttrium garnet (YAG), doped with neodymium (Nd) and the excited particles are neodymium ions $Nd^{3+}$. Such lasers typically emit light at a wavelength of about 1064 nanometers in the infrared spectrum. Unfortunately, problems are often experienced when attempting to laser weld capacitors for small case sizes. Namely, the small case size requires that the laser be positioned relatively close to the location of the anode wire and termination. At such a close location, however, the laser can be readily deflected by the wire or anode termination and come into contact with the organic solid electrolyte of the capacitor. Due to its high energy, the deflected laser beam can significantly increase the temperature of the organic solid electrolyte to a point where it begins to carbonize. The carbonized portions of the organic solid electrolyte come into a contact with a dielectric layer and may thus lead to poor electrical properties (e.g., high leakage current) in the resulting capacitor.

As such, a need exists for organic solid electrolytic capacitors that may be laser welded and yet retain excellent properties.

SUMMARY OF THE INVENTION

In accordance with one embodiment of the present invention, a solid electrolytic capacitor element is disclosed that comprises an anode body containing a valve metal composition, a dielectric layer overlying the anode body, a solid organic electrolyte layer overlying the dielectric layer, and a light reflective layer overlying the solid organic electrolyte layer. The light reflective layer contains a plurality of reflective particles having an index of refraction of about 1.7 or more.

In accordance with another embodiment of the present invention, a solid electrolytic capacitor assembly is disclosed that comprises a solid electrolytic capacitor element comprising an anode body containing tantalum or niobium oxide, a dielectric layer overlying the anode body, a conductive polymer layer overlying the dielectric layer, and a light reflective layer overlying the conductive polymer layer. The light reflective layer contains titanium dioxide particles. The assembly further comprises an anode lead extending from the capacitor element, a cathode termination that is in electrical communication with the solid organic electrolyte layer, an anode termination that is laser welded to the anode lead, and a case that encapsulates the capacitor element and leaves at least a portion of the anode and cathode terminations exposed.

In accordance with still another embodiment of the present invention, a method of forming a solid electrolytic capacitor assembly is disclosed. The method comprises providing a solid electrolytic capacitor element comprising an anode body containing tantalum or niobium oxide, a dielectric layer overlying the anode body, and a conductive polymer layer overlying the dielectric layer, wherein an anode lead extends from a surface of the capacitor element. A light reflective layer is applied to at least the surface of the capacitor element from which the anode lead extends. The light reflective layer overlies the conductive polymer layer, wherein the light reflective layer contains reflective particles. A lead frame is provided that defines a cathode termination and an anode termination. The conductive polymer layer is electrically connected to the cathode termination and the anode lead is laser welded to the anode termination. The electrolytic capacitor element is encapsulated so that at least a portion of the anode termination and the cathode termination remain exposed.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
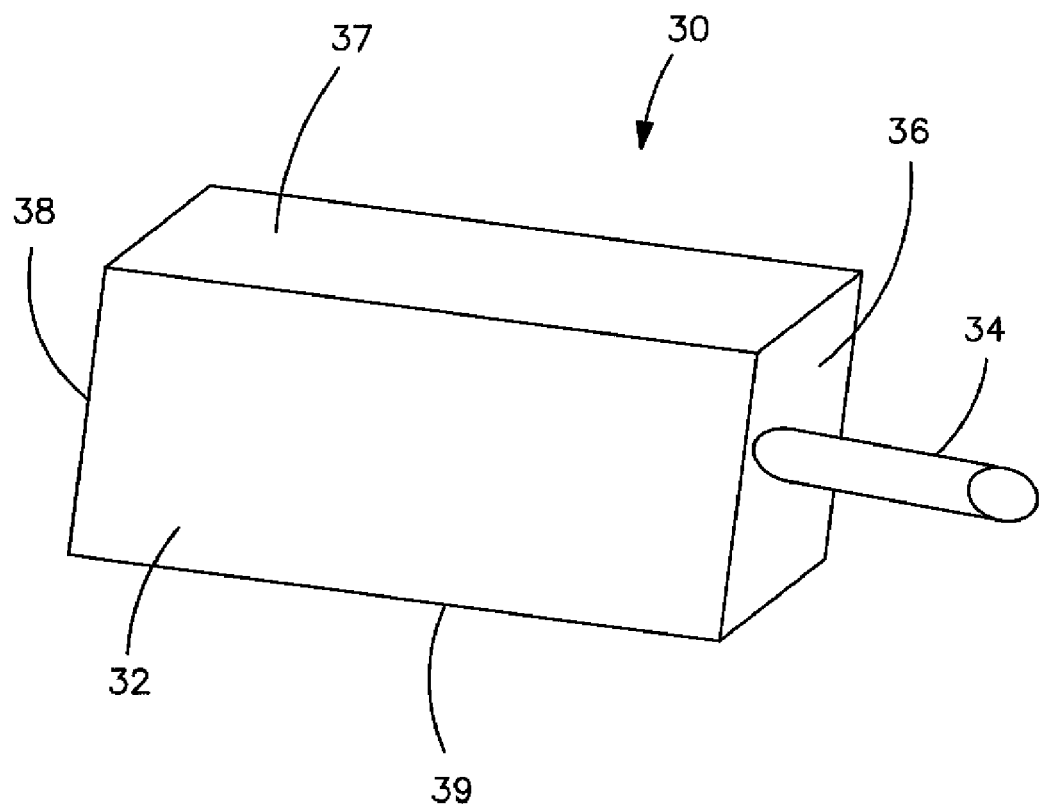
FIG. 1 is a perspective view of one embodiment of the solid electrolytic capacitor of the present invention.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that is capable of withstanding laser welding without a significant deterioration in its electrical performance. The capacitor contains an anode body, dielectric layer overlying the anode body, and a solid organic electrolyte layer overlying the dielectric layer. Furthermore, the capacitor of the present invention also employs a light reflective layer that overlies the solid organic electrolyte layer. The present inventors have discovered that such a light reflective layer may help reflect any light that inadvertently travels toward the capacitor element during laser welding. This results in reduced contact of the solid organic electrolyte with the laser and thus minimizes defects in the electrolyte that would have otherwise been formed by carbonization. The resultant laser-welded capacitor is therefore characterized by such performance characteristics as relatively low ESR and low leakage currents. Various embodiments of the present invention will now be described in more detail.

The anode body may be formed using any technique known in the art. In one embodiment, for example, the anode body is formed from a valve metal composition. The valve metal composition may have a high specific charge, such as about 60,000 microFarads*Volts per gram ("µF*V/g") or more, in some embodiments about 70,000 µF*V/g or more, in some embodiments about 100,000 µF*V/g or more, and in some embodiments, about 150,000 µF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the anode body may be formed from a valve metal oxide having an atomic ratio of metal to oxygen of 1:less than 25, in some embodiments 1:less than 2.0, in some embodiments 1:less than 1.5, and in some embodiments, 1:1. Examples of such valve metal oxides may include niobium oxide (e.g., NbO), tantalum oxide, etc., and are described in more detail in U.S. Pat. No. 6,322,912 to Fife, which is incorporated herein in its entirety by reference thereto for all purposes.

Conventional fabricating procedures may generally be utilized to form the anode body. In one embodiment, a tantalum or niobium oxide powder having a certain particle size is first selected. The particle size may vary depending on the desired voltage of the resulting capacitor element. For example, powders with a relatively large particle size (e.g., about 10 micrometers) are often used to produce high voltage capacitors, while powders with a relatively small particle size (e.g., about 0.5 micrometers) are often used to produce low voltage capacitors. The particles are then optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthaline, vegetable wax, and microwaxes (purified paraffins). The binder may be dissolved and dispersed in a solvent. Exemplary solvents may include water; acetone; methyl isobutyl ketone; trichloromethane; fluorinated hydrocarbons (freon) (DuPont); alcohols; and chlorinated hydrocarbons (carbon tetrachloride). When utilized, the percentage of binders and/or lubricants may vary from about 0.1% to about 8% by weight of the total mass. It should be understood, however, that binders and lubricants are not required in the present invention. Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode body subsequent to pressing and/or sintering of the anode body.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode body may also be utilized in accordance with the present invention, such as described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; 5,495,386 to Kulkarni; and 6,322,912 to Fife, which are incorporated herein in their entirety by reference thereto for all purposes.

Although not required, the thickness of the anode body may be selected to improve the electrical performance of the capacitor. For example, the thickness of the anode body (in the −z direction in FIG. 1) may be about 4 millimeters or less, in some embodiments, from about 0.2 to about 3 millimeters, and in some embodiments, from about 0.4 to about 1 millimeter. Such a relatively small anode thickness (i.e., "low profile") helps dissipate heat generated by the high specific charge powder and also provide a shorter transmission path to minimize ESR and inductance. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

The anode body may be anodized so that a dielectric layer is formed over and/or within the anode. Anodization is an electrical chemical process by which the anode metal is oxidized to form a material having a relatively high dielectric constant. For example, a tantalum anode body may be anodized to form tantalum pentoxide ($Ta_2O_5$), which has a dielectric constant "k" of about 27. The anode body may be dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric quality is formed over the surface of the tantalum pellet. The anodization voltage typically ranges from about 5 to about 200 volts, and in some embodiments, from about 20 to about 100 volts. In addition to being formed on the surface of the anode body, a portion of the dielectric oxide film will also typically form on the surfaces of the pores. It should be understood that the dielectric layer may be formed from other types of materials and using different techniques.

Once the dielectric layer is formed, a protective coating may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming solid organic electrolytes, which acts as the true cathode of the capacitor. For example, a conductive polymer coating may be used to form the solid organic electrolyte. The conductive polymer coating may contain one or more conductive polymers, such as polypyrroles; polythiophenes, such as poly(3,4-ethylenedioxy thiophene) (PEDT); polyanilines; polyacetylenes; poly-p-phenylenes; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy thiophene) may initially be mixed with a polymerization catalyst to form a solution. For example, one suitable polymerization catalyst is BAYTRON C, which is iron Ill toluenesulphonate and sold by HC Starck. BAYTRON C is a commercially available catalyst for BAYTRON M, which is 3,4-ethylene dioxythiophene, a PEDT monomer also sold by HC Starck. In most embodiments, once applied, the conductive polymer is healed. Healing may occur after each application of a conductive polymer layer or may occur after the application of the entire conductive polymer coating.

In addition to conductive polymers, the solid electrolyte may also be formed from other organic materials, such as 7,7',8,8'-tetracyanoquinodimethane complex (TCNQ complex), which is a low resistivity organic semiconductor. Techniques for forming such solid organic electrolytes are described, for instance, in U.S. Pat. No. 5,729,428 to Sakata, at al., which is incorporated herein in its entirety by reference thereto for all purposes. Although various methods have been described above, it should be understood that any other method for applying the organic electrolyte may also be utilized in the present invention.

Once the solid organic electrolyte is formed, the part may optionally be applied with a carbon layer (e.g., graphite) and silver layer, respectively. The silver coating may, for instance, act as a solderable conductor, contact layer, and/or charge collector for the capacitor element and the carbon coating may limit contact of the silver coating with the solid organic electrolyte. Such coatings may cover some or all of the solid organic electrolyte.

Regardless of the particular manner in which the capacitor element is formed, a light reflective layer is also provided that overlies at least a portion of the solid organic electrolyte layer. The light reflective layer is configured to reflect incident laser light so that it does not substantially contact the solid organic electrolyte. This limits potential carbonization of the solid organic electrolyte during laser welding. The light reflective layer generally contains particles having a relatively high index of refraction, such as about 1.7 or more, in some embodiments about 2.0 or more, in some embodiments about 2.2 or more, and in some embodiments, about 2.4 or more. To optimize the electrical properties of the capacitor, it is also typically desired that the light reflective layer is nonconductive. In this regard, the reflective particles are typically formed from a dielectric material, such as inorganic particles, e.g., calcium carbonate, magnesium carbonate, barium carbonate, magnesium sulfate, barium sulfate, calcium sulfate, zinc oxide, zinc sulfide, magnesium oxide, calcium oxide, titanium oxide, alumina, aluminum hydroxide, hydroxyapatite, silica, mica, talc, kaolin, clay, glass powder, zeolite, and so forth; organic particles; and so forth. Particularly suitable dielectric particles for use in the light reflective layer include rutile titanium dioxide (refractive index of about 2.73), anatase titanium dioxide (refractive index of about 2.55), zinc sulfide (refractive index of about 2.32), and zinc oxide (refractive index of 2.0).

The reflective particles typically possess a low content of coloring elements such as vanadium, iron, niobium, copper, and manganese, to minimize their light absorbing capacity. For example, titanium dioxide having a vanadium content of 5 ppm or less may be employed. Such particles may be produced by a chlorine process in which rutile ore composed mainly of titanium oxide is reacted with chlorine gas in a high temperature oven at about 1,000° C. to generate titanium tetrachloride. Then, the titanium tetrachloride is burned with oxygen to form high purity titanium oxide. Although typically possessing a low content of coloring elements, the particles may nevertheless be applied with a treatment to improve other properties (e.g., disperibility). Examples of such treatments include fatty acids (e.g., stearic acid), fatty acid esters, etc.

The particle size of the reflective particles may be selected to optimize light scattering of the layer. For example, the particle size (D) at which the maximum scattering power is seen for a high refractive index particle may be estimated by the following formula:

$$D = \frac{2\lambda}{\pi(n_1 - n_2)}$$

wherein, $\lambda$ is the wavelength of the incident light, $n_1$ is the refractive index of the particle, and $n_2$ is the refractive index of the continuous phase of the layer (e.g., the refractive index of water is about 1.33). Nd:YAG lasers, for example, typically emit light with a wavelength of 1064 nm in the infrared spectrum. At this wavelength, the estimated optimal scattering particle sizes for rutile and anatase titanium dioxide are about 0.47 μm and about 0.55 μm, respectively. In light of the above, the reflective particles of the present invention may be selected to have an average particle size ranging from about 0.01 to about 5 µm, in some embodiments from about 0.05 to about 2 µm, and in some embodiments, from about 0.1 to about 1 µm.

To form the light reflective layer, the reflective particles are generally dispersed in a solvent. Any solvent of a variety of solvents may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. One particular benefit of the present invention is that aqueous solvents (e.g., water) may be employed. In fact, water may constitute about 20 wt. % or more, in some embodiments, about 50 wt. % or more, and in some embodiments, about 75 wt. % to 100 wt. % of the solvent(s) used in the coating formulation.

The total concentration of solvent(s) employed in the coating formulation may vary, but is typically from about 10 wt. % to about 90 wt. %, in some embodiments from about 20 wt. % to about 85 wt. %, and in some embodiments, from about 40 wt. % to about 80 wt. % of the coating formulation. Of course, the specific amount of solvent(s) employed depends in part on the desired solids content and/or viscosity of the coating formulation. For example, the solids content may range from about 10% to about 90% by weight, more particularly, between about 15% to about 80% by weight, and even more particularly, between about 20% to about 60% by weight. By varying the solids content of the coating formulation, the presence of the light reflective particles in the coating formulation may be controlled. For example, to form a coating formulation with a higher level of light reflective particles, the formulation may be provided with a relatively high solids content so that a greater percentage of the particles are incorporated into the layer. In addition, the viscosity of the coating formulation may also vary depending on the application method and/or type of solvent employed. The viscosity is typically, however, from about 5 to about 500 centipoise, in some embodiments from about 10 to about 450 centipoise, and in some embodiments, from about 50 to about 400 centipoise, as measured with a Brookfield DV-1 viscometer using Spindle No. 2 operating at 30 rpm and 25° C. If desired, thickeners or other viscosity modifiers may be employed in the coating formulation to increase or decrease viscosity.

The coating formulation may also employ a binder to help retain the light reflective particles on the capacitor element after the solvent is removed from the coating formulation. Although any binder may be employed, organic binders are particularly suitable for use in the present invention. Examples of such binders may include, for instance, poly (vinyl butyral); poly(vinyl acetate); poly(vinyl alcohol); poly (vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); silicon polymers, such as poly(methyl siloxane), poly(methylphenyl siloxane); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; and acrylic polymers, such as sodium polyacrylate, poly(lower alkyl acrylates), poly(lower alkyl methacrylates) and copolymers of lower alkyl acrylates and methacrylates. Particularly suitable binders for use in the coating formulation are latex polymer binders having a glass transition temperature of about 50° C. or less so that the flexibility of the resulting coating formulation is not substantially restricted. Moreover, the latex polymer also typically has a glass transition temperature of about −35° C. or more to minimize its tackiness. Some suitable polymer lattices that may be utilized in the present invention may be based on polymers such as, but are not limited to, styrene-butadiene polymers, polyvinyl acetate homopolymers, vinyl-acetate ethylene copolymers, vinyl-acetate acrylic or methacrylic polymers, ethylene-vinyl chloride polymers, ethylene-vinyl chloride-vinyl acetate polymers, polyvinyl chloride polymers, nitrile polymers, and any other suitable latex polymer known in the art.

In addition to binders, the coating formulation may also include other components that facilitate the application of the light reflective particles to the capacitor element. For example, one or more dispersants may be employed in the coating formulation to reduce the surface tension of the suspension. One class of suitable dispersants includes anionic polymers having acid groups or salts thereof. Such polymers, for example, typically contain at least one ethylenically unsaturated acid containing monomer and optionally at least one ethylenically unsaturated nonionic monomer. Suitable acid monomers include monomers having carboxylic acid groups, such as acrylic acid, methacrylic acid, itaconic acid, fumaric acid, crotonic acid, maleic acid, monomethyl itaconate, monomethyl fumarate, and monobutyl fumarate; anhydrides, such as maleic anhydride and itaconic anhydride; or combinations thereof. Suitable ethylenically unsaturated monomers include alkyl esters of (meth)acrylic acid, such as ethyl acrylate, butyl acrylate, and methyl methacrylate; hydroxy esters of (meth)acrylic acid, such as hydroxyethyl methacrylate, hydroxyethyl acrylate, hydroxypropyl acrylate, and hydroxypropyl methacrylate; aromatic monomers, such as styrene and α-methyl styrene; and alkenes, such as di-isobutylene.

A wetting agent, or surfactant, may also be employed in the coating formulation to facilitate the formation of homogeneously uniform coating formulations having desirable spreadability. Suitable surfactants may include cationic surfactants, nonionic surfactants, anionic surfactants, amphoteric surfactants, and so forth. Nonionic surfactants, for instance, may have a hydrophobic base, such as a long chain alkyl group or an alkylated aryl group, and a hydrophilic chain comprising a certain number (e.g., 1 to about 30) of ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, and mixtures thereof. Particularly suitable nonionic surfactants may include the polyethylene oxide condensates of one mole of alkyl phenol containing from about 8 to 18 carbon atoms in a straight- or branched-chain alkyl group with about 5 to 30 moles of ethylene oxide. Specific examples of alkyl phenol ethoxylates include nonyl condensed with about 9.5 moles of ethylene oxide per mole of nonyl phenol, dinonyl phenol condensed with about 12 moles of ethylene oxide per mole of phenol, dinonyl phenol condensed with about 15 moles of ethylene oxide per mole of phenol and diisoctylphenol condensed with about 15 moles of ethylene oxide per mole of phenol. Such compounds are commercially available under the trade name Triton™ CF-100 from Dow Chemical Co, of Midland, Mich.

Plasticizers may also be employed in the coating formulation to enhance the film-forming characteristics of the coating formulation. Plasticizers are well-known and a wide range of plasticizers can be employed. Examples of typical plasticizers include mineral oil; glycols, such as propylene glycol; phthalic esters, such as dioctyl phthalate and benzyl butyl phthalate; and long-chain aliphatic acids, such as oleic acid and stearic acid; and mixtures thereof.

The concentration of each component of the coating formulation may vary depending on the amount of heat desired, the wet pick-up of the application method utilized, etc. For example, the amount of the light reflective particles within the coating formulation may range from about 10 wt. % to about 80 wt. %, in some embodiments from about 20 wt. % to about 75 wt. %, and in some embodiments, from about 25 wt. % to about 50 wt. %. Binder(s) may also constitute from about 0.01 wt. % to about 20 wt. %, in some embodiments from about 0.1 wt. % to about 15 wt. %, and in some embodiments, from about 0.5 wt. % to about 10 wt. % of the coating formulation. Other components, such as dispersants, surfactants, plasticizers, etc., may each constitute from about 0.001 wt. % to about 10 wt. %, in some embodiments from about 0.01 wt. % to about 5 wt. %, and in some embodiments from about 0.1 wt. % to about 3 wt. % of the coating formulation.

Regardless of the particular manner in which it is formed, the coating formulation is deposited onto a surface of the capacitor element using known methods such as, dipping, spraying, printing, molding, extrusion, etc. For example, the capacitor element may simply be dipped into the coating formulation to the desired level. The coated capacitor element may then be allowed to dry, either under ambient conditions or in a heating step, so that most, if not all, of the solvent is removed. For example, the capacitor element may be heated in one or more steps at a temperature of from about 50° C. to about 300° C., in some embodiments from about 60° C. to about 200° C., and in some embodiments, from about 70° C. to about 150° C. Heating may occur in air, or under a controlled atmosphere (e.g., under vacuum). The final dried coating typically possesses the reflective particles in an amount of about 80 wt. % to 100 wt. %, in some embodiments, from about 85 wt. % to about 99.9 wt. %, and in some embodiments, from about 90 wt. % to about 99 wt. %. To optimize its reflectivity, the coating also typically has a relatively thin thickness, such as about 100 µm or less, in some embodiments from about 20 to about 80 µm, and in some embodiments, from about 30 to about 60 µm.

Generally speaking, the light reflective layer may be applied to any surface of the capacitor element so that it can reduce contact of the solid organic electrolyte with a laser. For example, the light reflective layer may be located on a front surface of the capacitor element through which the anode wire (e.g., tantalum wire) extends in a longitudinal direction. The light reflective layer may likewise be located on the bottom and/or top surface of the capacitor element, which extend in a direction that is generally parallel to the longitudinal direction of the anode wire. The light reflective layer may cover the entire area or only a portion of the area of the surface to which it is applied. In one embodiment, for example, the light reflective layer covers about 90% or more, in some embodiments about 95% or more, and in some embodiments, about 98% or more of the front surface of the capacitor element.

Figure 2:
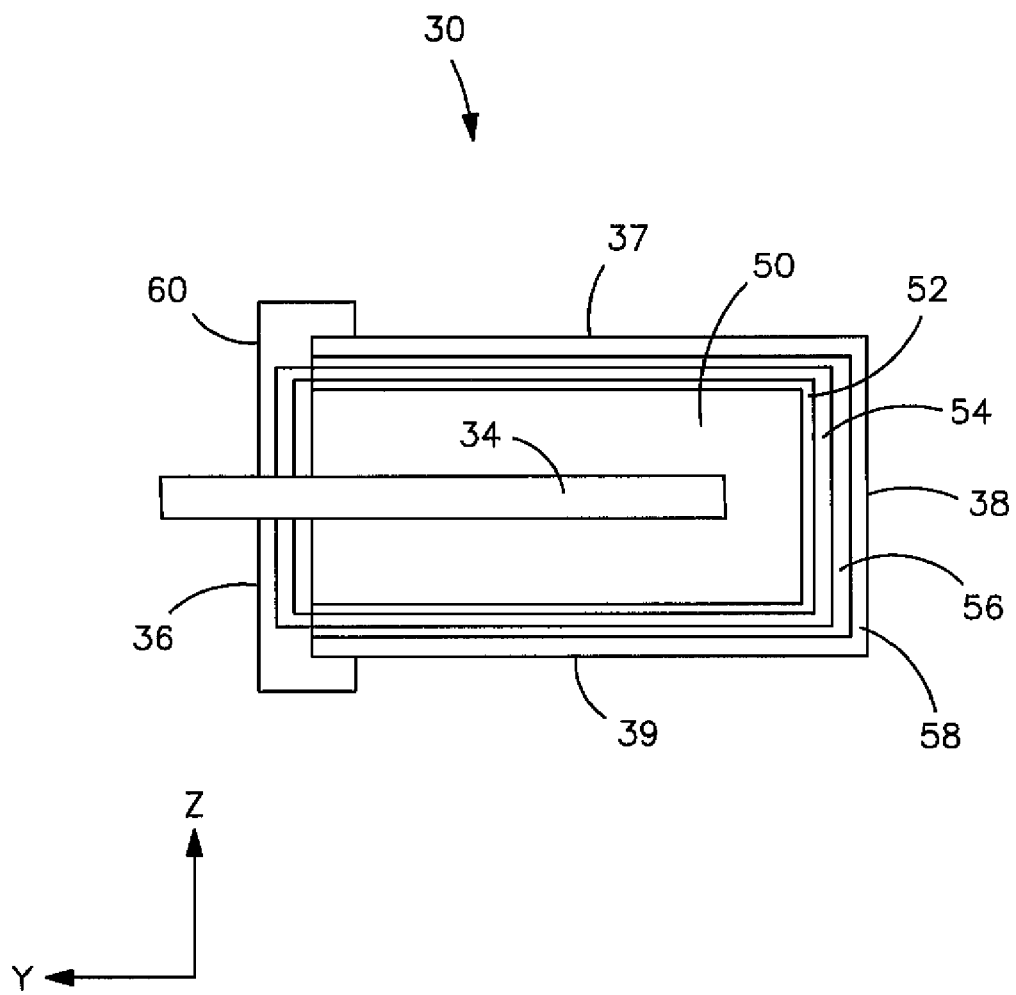
FIG. 2 is a cross-sectional view of the capacitor of FIG. 1 taken along a line 2-2.

Referring to FIGS. 1-2, for example, one embodiment of a capacitor element 30 is shown that has a generally rectangular shape and contains a front surface 36, rear surface 38, top and bottom surfaces 37 and 39, respectively, and side surfaces 32 (only one of which is illustrated). An anode wire 34 extends from the front surface 36 of the capacitor element 30 in a longitudinal direction ("y" direction). As further shown in FIG. 2, the capacitor element 30 contains an anode body 50, a dielectric layer 52 overlying the anode body 50, an organic solid organic electrolyte layer 54 overlying the dielectric layer 52, a graphite layer 56 overlying the organic solid organic electrolyte layer 54, and a silver layer 58 overlying the graphite layer 56. In the embodiment illustrated, the dielectric layer 52 and solid organic electrolyte layer 54 overly the anode body 50 at each surface of the capacitor element 30, i.e., at the front surface 36, rear surface, 38, top surface 37, bottom surface 39, and side surfaces (not shown in FIG. 2). Further, the graphite and silver layers 56 and 58 overly each surface of the solid organic electrolyte layer 54, except for the front surface 36. Thus, in this embodiment, the front surface 36 contains the solid organic electrolyte, but is generally free of the graphite and silver layers. Of course, it should be understood that such layers may be applied to any surface of the capacitor, and need not be applied in the manner illustrated.

The capacitor element 30 also contains a light reflective layer 60 formed according to the present invention, which overlies the solid organic electrolyte layer 54 at the front surface 36. Further, as shown in FIG. 2, the light reflective layer 60 also overlies a portion of the solid organic electrolyte layer 54, graphite layer 56, and silver layer 58 on the top and bottom surfaces 37 and 39, respectively.

Figure 3:
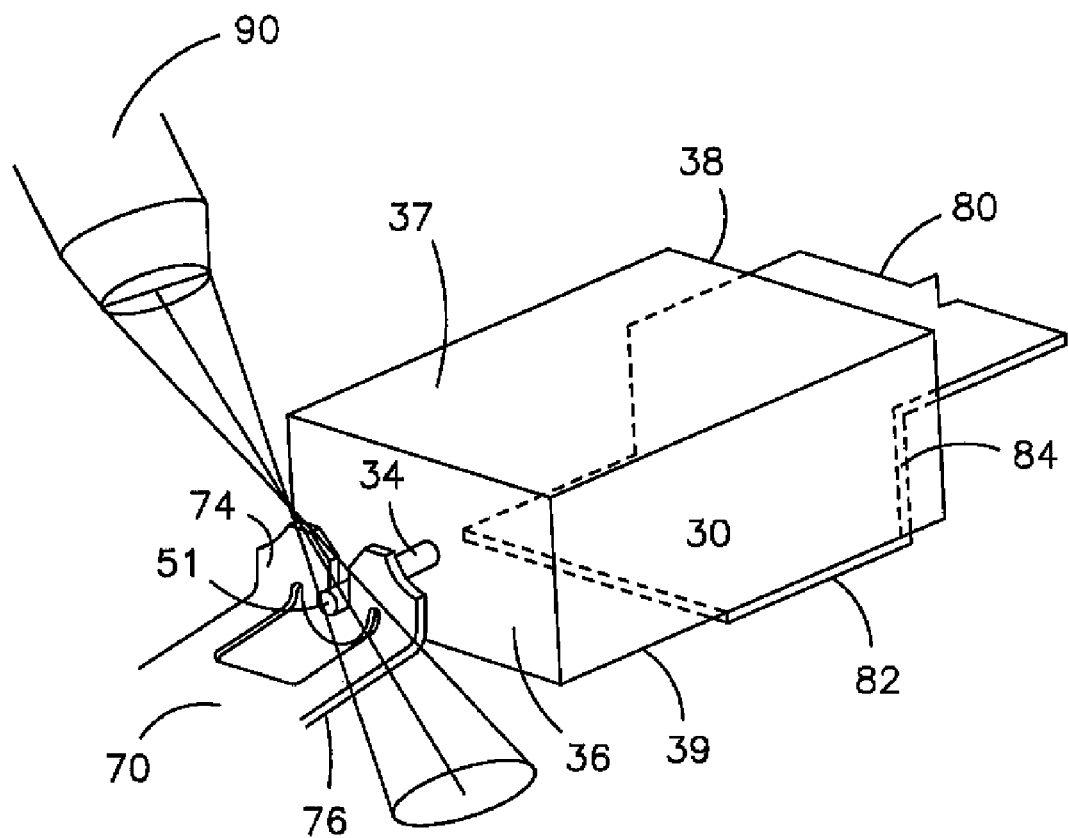
FIG. 3 is a schematic illustration of one embodiment of the present invention for laser welding a capacitor to an anode termination.

Upon formation of the capacitor element 30, anode and cathode termination may be electrically connected to the anode wire 34 and the solid organic electrolyte 54 layer (via the graphite and silver layers), respectively. The specific configuration of the terminations may vary as is well known in the art. Referring to FIG. 3, for example, one embodiment is shown that includes an anode termination 70 and a cathode termination 80. In this particular embodiment, the cathode termination contains a first portion 82 positioned substantially perpendicular to a second portion 84. The first portion 82 is in electrical contact with the lower surface 39 of the capacitor element 30 and the second portion 84 is in electrical contact with the rear surface 38 of the capacitor element 30. To attach the capacitor element 30 to the cathode termination 80, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

The anode termination 70 contains a first portion 76 positioned substantially perpendicular to a second portion 74. The second portion 74 contains a region that carries the anode wire 34. In the illustrated embodiment, the region 51 possesses a "U-shape" for further enhancing surface contact and mechanical stability of the wire 34. The anode wire 34 is then welded to the region 51 with a laser 90. As illustrated in FIG. 3, contact of the laser beam may result in the reflection of light towards the capacitor element 30. Due to the presence of the light reflective layer in accordance with the present invention, however, the light does not significantly damage or carbonize the solid organic electrolyte layer.

Figure 4:
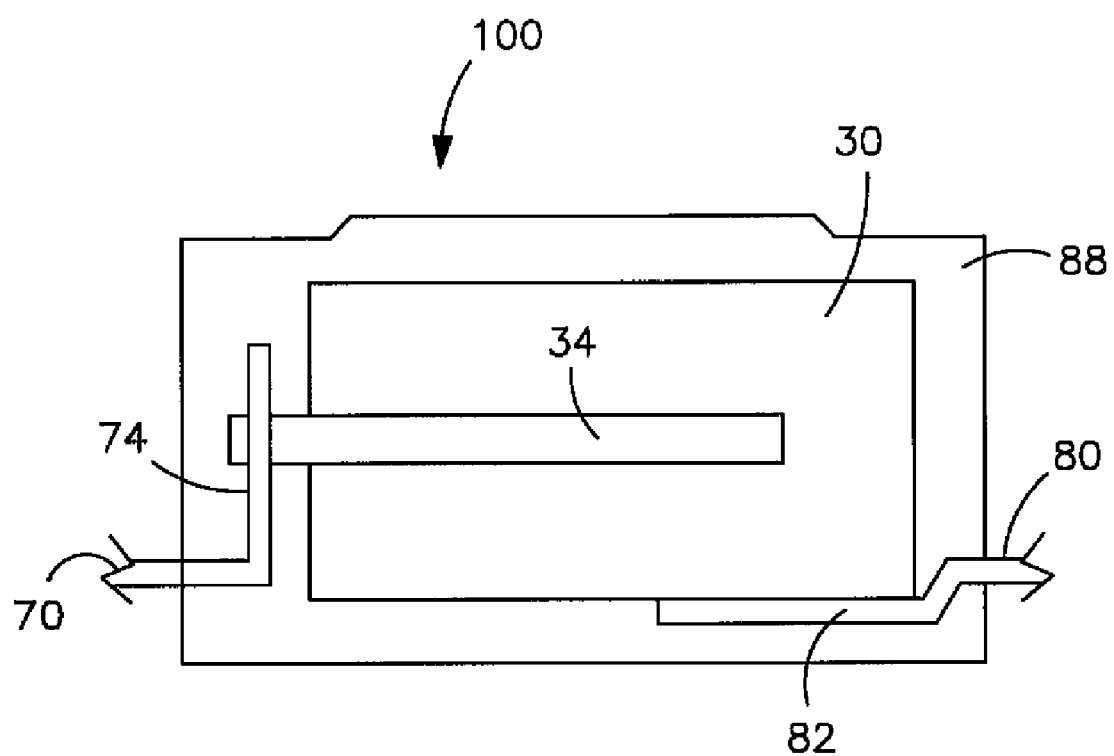
FIG. 4 is a cross-sectional view of a laser welded capacitor formed in accordance with one embodiment of the present invention.

Once the capacitor element is attached to the terminations, it is enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). Referring to FIG. 4, for example, one particular embodiment of such an encapsulating case for a capacitor assembly 100 is shown as element 88. The encapsulating case 88 provides additional structural and thermal protection for the capacitor assembly 100. After encapsulation, exposed portions of the respective anode and cathode terminations may be aged, screened, and trimmed. If desired, the exposed portions may be optionally bent twice along the outside of the casing 88 (e.g., at an approximately 90° angle).

As a result of the present invention, a capacitor may be formed that exhibits excellent electrical properties. For example, the capacitor of the present invention typically has an ESR less than about 1000 milliohms (mohms), in some embodiments less than about 500 mohms, and in some embodiments, less than about 100 mohms. The equivalent series resistance of a capacitor generally refers to the extent that the capacitor acts like a resistor when charging and discharging in an electronic circuit and is usually expressed as a resistance in series with the capacitor. In addition, the resulting leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 $\mu A/\mu F*V$, in some embodiments less than about 0.01 $\mu A/\mu F*V$, and in some embodiments, less than about 0.001 $\mu A/\mu F*V$, wherein $\mu A$ is microamps and $uF*V$ is the product of the capacitance and the rated voltage.

The present invention may be better understood by reference to the following example.

Test Procedures

Equivalent Series Resistance (ESR), Capacitance, and Dissipation Factor:

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 2 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

Example

The ability to form a laser-welded organic solid electrolytic capacitor in accordance with the present invention was demonstrated. Initially, a tantalum anode was embedded with a tantalum wire and sintered at 1320° C. The resulting anode had a size of 1.3×2.4×1.8 mm, a density of 5.3 g/cm³, and a CV of 1900 μFV. To anodize the tantalum anode, it was dipped into an orthophosphoric acid/water solution having a conductivity of 8.6±0.3 mS/cm and temperature of 85±5° C. and twice electro-oxidated at 18V and washed with deionized water, with annealing in an air circulated oven at 325° C. in between the cycles. The entire part was then dipped into a 0.8 wt. % solution of shellac (A.S. Suter Co., Ltd.) to form a pre-coat layer. Thereafter, a conductive polymer layer was formed using a conventional sequential dipping procedure into a solution of iron(III) p-toluenesulfonate in n-butanol (BAYTRON CB40, H.C. Starck) and a solution of 3,4-ethylenedioxythiophene (BAYTRON M, H.C. Starck) with 5 wt. % of 2-hydroxy ethyl methacrylate (Aldrich), followed by ethanol washing and sulfuric acid reform. This cycle was repeated 10 times. Thereafter, the part was dipped up to its shoulder for 2 seconds into a graphite dispersion (Graphite 7230, DuPont) at room temperature and healed for 30 minutes at 125° C. The part was then dipped up to its shoulder for 2 seconds in a silver dispersion (Thermoset K 611-14, Lord Co.) at room temperature and healed for 30 minutes at 125° C.

To form the light reflective layer, a composition was obtained from Primalex a.s., Czech Republic that contained 58.5 wt. % water, 38.5 wt. % titanium dioxide, 0.31 wt. % hydroxyethylcellulose, 1.24 wt. % polyvinylacetate dispersion, 0.12 wt. % sodium polysulfate, 0.87 wt. % polyacrylic acid salts, 0.3 wt. % stabilizers, and 0.19 wt. % defoaming agents. The part was dipped into the composition over it shoulder to fully cover its front surface. Within 2 minutes after application of the reflective coating, the part (except for the front surface) was subsequently washed with deionized water and dried at 125° C. for 30 minutes.

Once the capacitor element was formed, it was then laser welded to a lead frame having a thickness of 0.10 millimeters (copper K88 as a raw material). The diameter of the anode wire was 0.17 millimeters. Laser welding was performed on a machine consisting of a laser unit and a optical head. The laser was pulsed Nd-YAG laser with a wavelength of 1.064 μm and the optical head had a focal length of 150 mm and a focused spot diameter of 0.3 mm. The optical head consisted of bifocal optics with a spot separation of 0.3 mm. The calculated energy of the entire laser pulse was 2.2 J. Silver loaded adhesive ACE 10131 (Protavic) was used to attach the cathode termination lead (the opposite part of the leadframe). The adhesive was cured at 175° C. for 1 minute. Once the capacitor element was attached to the leadframe, it was then encapsulated to form a standard B case size (AVX) capacitor and cured at 170° C. for 60 seconds.

Various parameters were then tested within a population of 25 000 pcs (nominal values: 100 uF @ 6.3 V). The results are set forth below.

| Average values of: | NO REFLECTIVE LAYER | | WITH REFLECTIVE LAYER | |
|---|---|---|---|---|
| | Before laser welding | Post encapsulation | Before laser welding | Post encapsulation |
| DCL [µA] | 6.3 ± 9.5 | 115.2 ± 62.5 | 6.2 ± 8.7 | 35.0 ± 29.5 |
| Portion of parts with DCL >1 mA [%] | 0.1 | 20.4 | 0.1 | 1.5 |
| capacitance [µF] | 96.4 ± 1.2 | 96.3 ± 1.2 | 96.6 ± 1.2 | 96.5 ± 1.5 |
| ESR [mOhm] | 45.2 ± 3.4 | 48.4 ± 4.8 | 45.4 ± 3.9 | 47.7 ± 4.2 |
| dissipation factor [%] | 1.78 ± 0.19 | 1.75 ± 0.24 | 1.72 ± 0.24 | 1.78 ± 0.23 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method of forming a solid electrolytic capacitor assembly, the method comprising:
   providing a solid electrolytic capacitor element comprising an anode body containing tantalum or niobium oxide, a dielectric layer overlying the anode body, and a conductive polymer layer overlying the dielectric layer, wherein an anode lead extends from a surface of the capacitor element;
   applying a light reflective layer to at least the surface of the capacitor element from which the anode lead extends, the light reflective layer overlying the conductive polymer layer, wherein the light reflective layer contains a plurality of reflective particles;
   providing a lead frame that defines a cathode termination and an anode termination;
   electrically connecting the conductive polymer layer to the cathode termination;
   laser welding the anode lead to the anode termination; and
   encapsulating the electrolytic capacitor element so that at least a portion of the anode termination and the cathode termination remain exposed.

2. The method of claim 1, wherein the reflective particles contain titanium dioxide.

3. The method of claim 2, wherein the titanium dioxide is rutile titanium dioxide, anatase titanium dioxide, or a mixture thereof.

4. The method of claim 1, wherein the reflective particles have an index of refraction of about 1.7 or more.

5. The method of claim 1, wherein the reflective particles have an index of refraction of about 2.0 or more.

6. The method of claim 1, wherein the reflective particles are formed from a dielectric material.

7. The method of claim 1, wherein the reflective particles are inorganic particles.

8. The method of claim 1, wherein the reflective particles have an average size of from about 0.1 to about 1 µm.

9. The method of claim 1, wherein the reflective particles constitute from about 80 wt. % to 100 wt. % of the light reflective layer.

10. The method of claim 1, wherein the reflective particles constitute from about 85 wt. % to 99.9 wt. % of the light reflective layer.

11. The method of claim 1, wherein the light reflective layer has a thickness of from about 20 to about 80 µm.

12. The method of claim 1, wherein the light reflective layer covers substantially the entire surface from which the anode lead extends.

13. The method of claim 1, wherein the light reflective layer overlies the conductive polymer layer at a second surface that is perpendicular to the surface from which the anode lead extends.

14. The method of claim 13, wherein the light reflective layer covers only a portion of the second surface.

15. The method of claim 1, wherein the capacitor element further comprises at least one additional layer that overlies the conductive polymer layer, the additional layer including a carbon layer, silver layer, or a combination thereof.

16. The method of claim 15, wherein the surface from which the anode lead extends is generally free from the additional layer.

17. The method of claim 1, wherein the conductive polymer layer includes a polythiophene.

18. The method of claim 17, wherein the polythiophene includes poly(3,4-ethylenedioxy thiophene).

19. A method of forming a solid electrolytic capacitor assembly, the method comprising:
   providing a solid electrolytic capacitor element comprising an anode body containing tantalum or niobium oxide, a dielectric layer overlying the anode body, and a conductive polymer layer overlying the dielectric layer, the conductive polymer layer including poly(3,4-ethylenedioxy thiophene), wherein an anode lead extends from a surface of the capacitor element;
   applying a light reflective layer to at least the surface of the capacitor element from which the anode lead extends, the light reflective layer overlying the conductive polymer layer, wherein the light reflective layer contains a plurality of titanium dioxide particles;
   providing a lead frame that defines a cathode termination and an anode termination;
   electrically connecting the conductive polymer layer to the cathode termination;
   laser welding the anode lead to the anode termination; and
   encapsulating the electrolytic capacitor element so that at least a portion of the anode termination and the cathode termination remain exposed.

* * * * *